United States Patent
Singh et al.

(10) Patent No.: US 11,347,613 B2
(45) Date of Patent: May 31, 2022

(54) INSERTING PROBABILISTIC MODELS IN DETERMINISTIC WORKFLOWS FOR ROBOTIC PROCESS AUTOMATION AND SUPERVISOR SYSTEM

(71) Applicant: UiPath, Inc., New York, NY (US)

(72) Inventors: Prabhdeep Singh, Bellevue, WA (US); Anton McGonnell, Bellevue, WA (US)

(73) Assignee: UiPath, Inc., New York, NY (US)

( * ) Notice: Subject to any disclaimer, the term of this patent is extended or adjusted under 35 U.S.C. 154(b) by 372 days.

(21) Appl. No.: 16/708,083

(22) Filed: Dec. 9, 2019

(65) Prior Publication Data

US 2021/0109834 A1    Apr. 15, 2021

Related U.S. Application Data

(60) Provisional application No. 62/915,434, filed on Oct. 15, 2019.

(51) Int. Cl.
*G06F 11/32* (2006.01)
*G06F 17/18* (2006.01)
(Continued)

(52) U.S. Cl.
CPC .......... *G06F 11/327* (2013.01); *G06F 11/302* (2013.01); *G06F 17/18* (2013.01); *G06N 20/00* (2019.01)

(58) Field of Classification Search
CPC ........ G06F 11/327; G06F 17/18; G06N 20/00
(Continued)

(56) References Cited

U.S. PATENT DOCUMENTS 5,598,076 A * 1/1997 Neubauer ................ B25J 9/161
318/568.22
7,181,314 B2 * 2/2007 Zhang .................... B25J 9/1687
414/754
(Continued)

FOREIGN PATENT DOCUMENTS

| CN | 110378487 A | 10/2019 |
|---|---|---|
| KR | 1020060063561 A | 6/2006 |
| KR | 1020187021817 | 8/2018 |

OTHER PUBLICATIONS

Casale, Frank. "Here come the robots: The emergence of Robotic Process Automation and the beginning of the end of Outsourcing as we know it." Tulostettu 25 (2014): 2018.pp. 1-4 (Year: 2018).*
(Continued)

*Primary Examiner* — Satish Rampuria
(74) *Attorney, Agent, or Firm* — LeonardPatel PC; Michael A. Leonard, II; Sheetal S. Patel

(57) ABSTRACT

Probabilistic models may be used in a deterministic workflow for robotic process automation (RPA). Machine learning (ML) introduces a probabilistic framework where the outcome is not deterministic, and therefore, the steps are not deterministic. Deterministic workflows may be mixed with probabilistic workflows, or probabilistic activities may be inserted into deterministic workflows, in order to create more dynamic workflows. A supervisor system may be used to monitor an ML model and raise an alarm, disable an RPA robot, bypass an RPA robot, or roll back to a previous version of the ML model when an error is detected by a data drift detector, a concept drift detector, or both.

17 Claims, 8 Drawing Sheets

(51) Int. Cl.
  *G06F 11/30* (2006.01)
  *G06N 20/00* (2019.01)
(58) Field of Classification Search
  USPC .................................................. 700/47–55
  See application file for complete search history.

(56) References Cited

U.S. PATENT DOCUMENTS

| | | | |
|---|---|---|---|
| 7,974,737 B2* | 7/2011 | Tilove | B25J 9/1666 |
| | | | 700/255 |
| 8,407,661 B2* | 3/2013 | Wang | G06F 8/38 |
| | | | 717/109 |
| 10,360,214 B2 | 7/2019 | Gold et al. | |
| 10,462,172 B1 | 10/2019 | Sadaghiani et al. | |
| 10,599,957 B2 | 3/2020 | Walters et al. | |
| 2007/0118238 A1 | 5/2007 | Lefebvre et al. | |
| 2016/0279790 A1 | 9/2016 | Meier et al. | |
| 2017/0220407 A1 | 8/2017 | Estrada et al. | |
| 2017/0330109 A1* | 11/2017 | Maughan | G06N 20/00 |
| 2017/0372232 A1 | 12/2017 | Maughan et al. | |
| 2018/0012143 A1 | 1/2018 | Hansen et al. | |
| 2018/0197123 A1* | 7/2018 | Parimelazhagan | |
| | | | G06Q 10/0633 |
| 2018/0308022 A1 | 10/2018 | Philips et al. | |
| 2018/0341688 A1 | 11/2018 | Ganesh et al. | |
| 2019/0066013 A1 | 2/2019 | Gupta et al. | |
| 2019/0066133 A1 | 2/2019 | Cotton | |
| 2019/0147357 A1 | 5/2019 | Erlandson et al. | |
| 2019/0180746 A1* | 6/2019 | Diwan | G06F 40/279 |
| 2019/0325341 A1 | 10/2019 | Kakhandiki et al. | |
| 2019/0332508 A1* | 10/2019 | Goyal | G06F 11/302 |
| 2020/0082296 A1 | 3/2020 | Fly et al. | |
| 2020/0111023 A1 | 4/2020 | Murugappan et al. | |

OTHER PUBLICATIONS

Anagnoste, Sorin. "Setting up a robotic process automation center of excellence." Management Dynamics in the Knowledge Economy 6.2 (2018): pp. 307-332. (Year: 2018).*

Primer, A. "Introduction To Robotic Process Automation." Institute for Robotic Process Automation (2015).pp. 1-35 (Year: 2015).*

Chin, Roland T., and Charles R. Dyer. "Model-based recognition in robot vision." ACM Computing Surveys (CSUR) 18.1 (1986): pp. 67-108. (Year: 1986).*

Chen, Heping, Thomas Fuhlbrigge, and Xiongzi Li. "Automated industrial robot path planning for spray painting process: a review." 2008 IEEE International Conference on Automation Science and Engineering. IEEE, 2008.pp. 552-527 (Year: 2008).*

Parasuraman, Raja, Thomas B. Sheridan, and Christopher D. Wickens. "A model for types and levels of human interaction with automation." IEEE Transactions on systems, man, and cybernetics-Part A: Systems and Humans 30.3 (2000): pp. 286-297. (Year: 2000).*

International Search Report & Written Opinion, dated Apr. 15, 2021, PCT Application No. PCT/US20/52424.

Roboyo Robotic Process Automation Page available at https://www.roboyo.de/en/blog/innovative-robotic-process-automation-technology/ (last accessed Dec. 12, 2019).

International Search Report and Written Opinion of the International Search Authority issued by the Korean Intellectual Property Office (KIPO) dated Nov. 27, 2020.

* cited by examiner

INSERTING PROBABILISTIC MODELS IN DETERMINISTIC WORKFLOWS FOR ROBOTIC PROCESS AUTOMATION AND SUPERVISOR SYSTEM

CROSS-REFERENCE TO RELATED APPLICATION

This application claims the benefit of U.S. Provisional Patent Application No. 62/915,434 filed Oct. 15, 2019. The subject matter of this earlier filed application is hereby incorporated by reference in its entirety.

FIELD

The present invention generally relates to robotic process automation (RPA), and more specifically, to inserting probabilistic models in deterministic workflows for RPA and a supervisor system.

BACKGROUND

Current RPA systems work in a logistic fashion with decision points in a sequential workflow. However, such workflows are based on set logic and are not dynamic. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to inserting probabilistic models in deterministic workflows for RPA and a supervisor system.

In an embodiment, a computer-implemented method for implementing probabilistic models in a deterministic workflow for RPA includes generating a deterministic RPA workflow for RPA robots, generating a plurality of RPA robots configured to execute the deterministic RPA workflow, and deploying the plurality of RPA robots. The computer-implemented method also includes training a machine learning (ML) model associated with a probabilistic activity to replace a deterministic activity in the RPA workflow.

In another embodiment, a computer-implemented method for implementing probabilistic models in a deterministic workflow for RPA includes generating a plurality of RPA robots configured to execute a deterministic RPA workflow and deploying the plurality of RPA robots configured to execute the deterministic RPA workflow. The computer-implemented method also includes training an ML model associated with a probabilistic activity to replace a deterministic activity in the RPA workflow.

In yet another embodiment, a computer-implemented method includes generating an RPA robot configured to execute an RPA workflow including a probabilistic activity and deploying the RPA robot. The computer-implemented method also includes monitoring, by a supervisor system, an ML model called by the probabilistic activity in the RPA workflow to ensure that the ML model is operating correctly using metrics on an input side via a data drift detector and on an output side using a concept drift detector.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
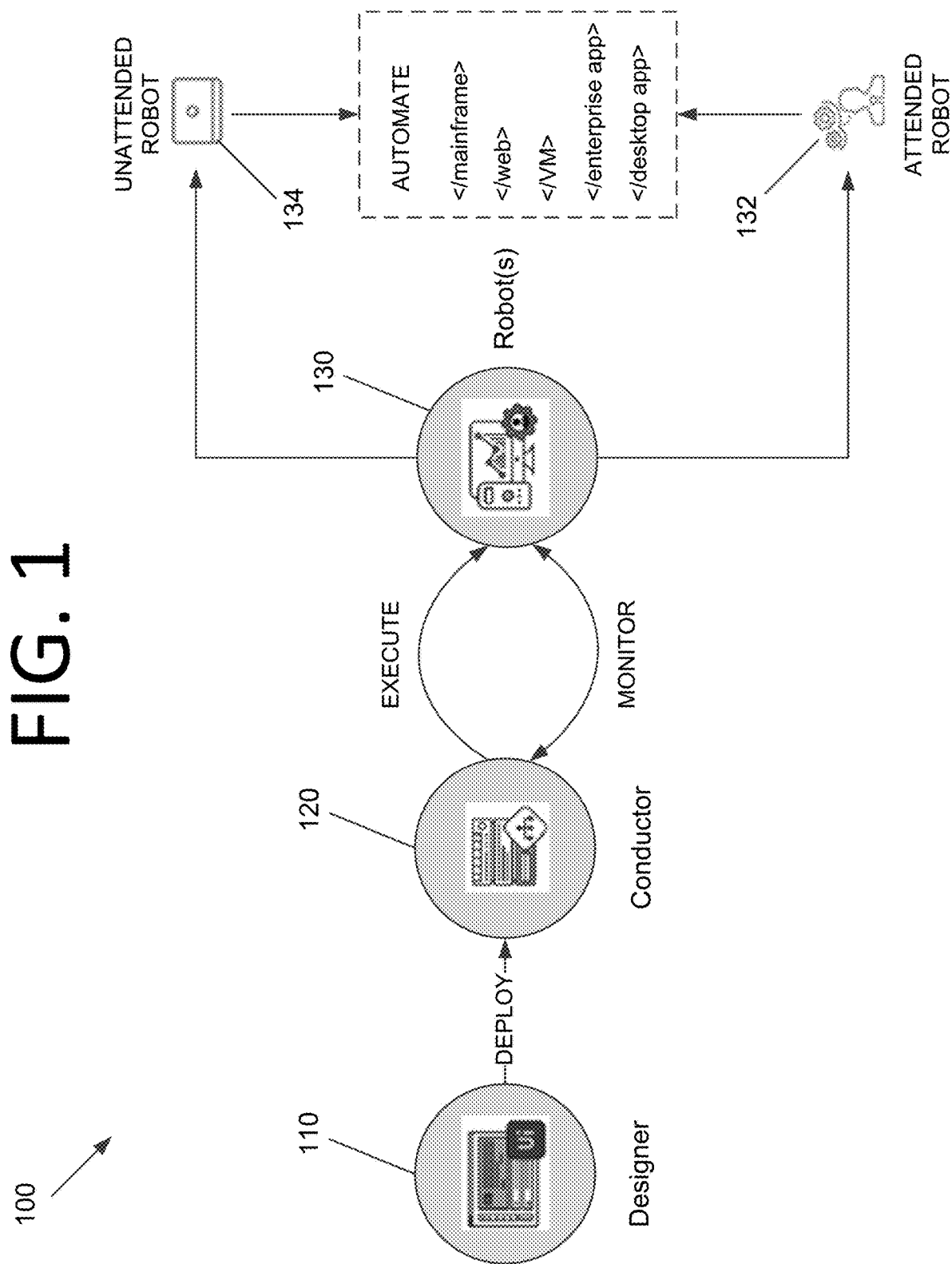
FIG. 1 is an architectural diagram illustrating an RPA system, according to an embodiment of the present invention.

Some embodiments pertain to using probabilistic models in a deterministic workflow for RPA. Such embodiments may make initial deployments faster, for example. Machine learning introduces a probabilistic framework where the outcome is not deterministic, and therefore, the steps are not deterministic. Deterministic workflows may be mixed with probabilistic workflows, or probabilistic activities may be inserted into deterministic workflows, in order to create more dynamic workflows. RPA workflows are usually in the form of logistic flow that is very deterministic with a fixed number of activities. However, probabilistic activities may be inserted in the place of one or more deterministic activities in the workflow in some embodiments. To insert a probabilistic activity, certain factors may be considered, such as a confidence level of a probabilistic activity. If a machine learning (ML) model associated with a probabilistic activity is trained such that it becomes accurate enough for use, a probabilistic activity may be used in the workflow in place of a deterministic activity. Thus, in some embodiments, workflows may begin as deterministic in nature and then be modified later to be probabilistic.

Supervisor System

Testing probabilistic systems can be difficult, however. Accordingly, in some embodiments, a supervisor system is used to monitor RPA robots executing probabilistic workflows to determine correct operation. For example, consider the case of an RPA implementation on an aircraft. A robot may be trained to perform certain controls, such as causing the aircraft to sacrifice altitude for speed if the robot determines that a stall may happen. However, this may not always be the desired action depending on flight conditions. For instance, performing this action shortly after takeoff may cause a crash.

The supervisor system may monitor the actions taken by robots and also monitor other data from the system. In the example above, the monitored data may include pilot actions. If the supervisor system determines that soon after the robot causes the aircraft to dive, the pilots pull back on the wheel to stop the dive. The supervisor system may then disable the robot or a portion of the robot's workflow and send the collected data so the robot can be retrained.

In some embodiments, an ML model may be monitored to ensure it is operating correctly with metrics on the input side and the output side. For instance, if the ML model requires sixteen data feeds, but one is broken, the ML model may not be suitable to use. This is monitoring for "data drift". A data drift detector may be included on the input side.

On the output side, it may be known what ranges to expect. For instance, if a hospital's return rate is known to not have been more than 10%, but it is determined that 290% of patients are coming back, something is wrong. This is called concept drift, which may be monitored by a concept drift detector. The supervisor system may thus expect an ML model to perform a certain way and comply with certain parameters. The supervisor system may raise an alarm if a data drift detector indicates an error, a concept drift detector indicates an error, or both.

Consider the case of a supervisor system supervising ML models implemented in an aircraft. If a certain ML model affecting control surfaces is run and the nose is dipped aggressively or the descent is rapid when the autopilot is engaged, this could be flagged by the supervisor system, and robots calling the ML models could be shut off or bypassed by manual control. If the robot is not mission critical, or a previous version of an ML model is known to work with a high confidence in a mission critical system, the supervisor system may roll the ML model back to a previous version.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
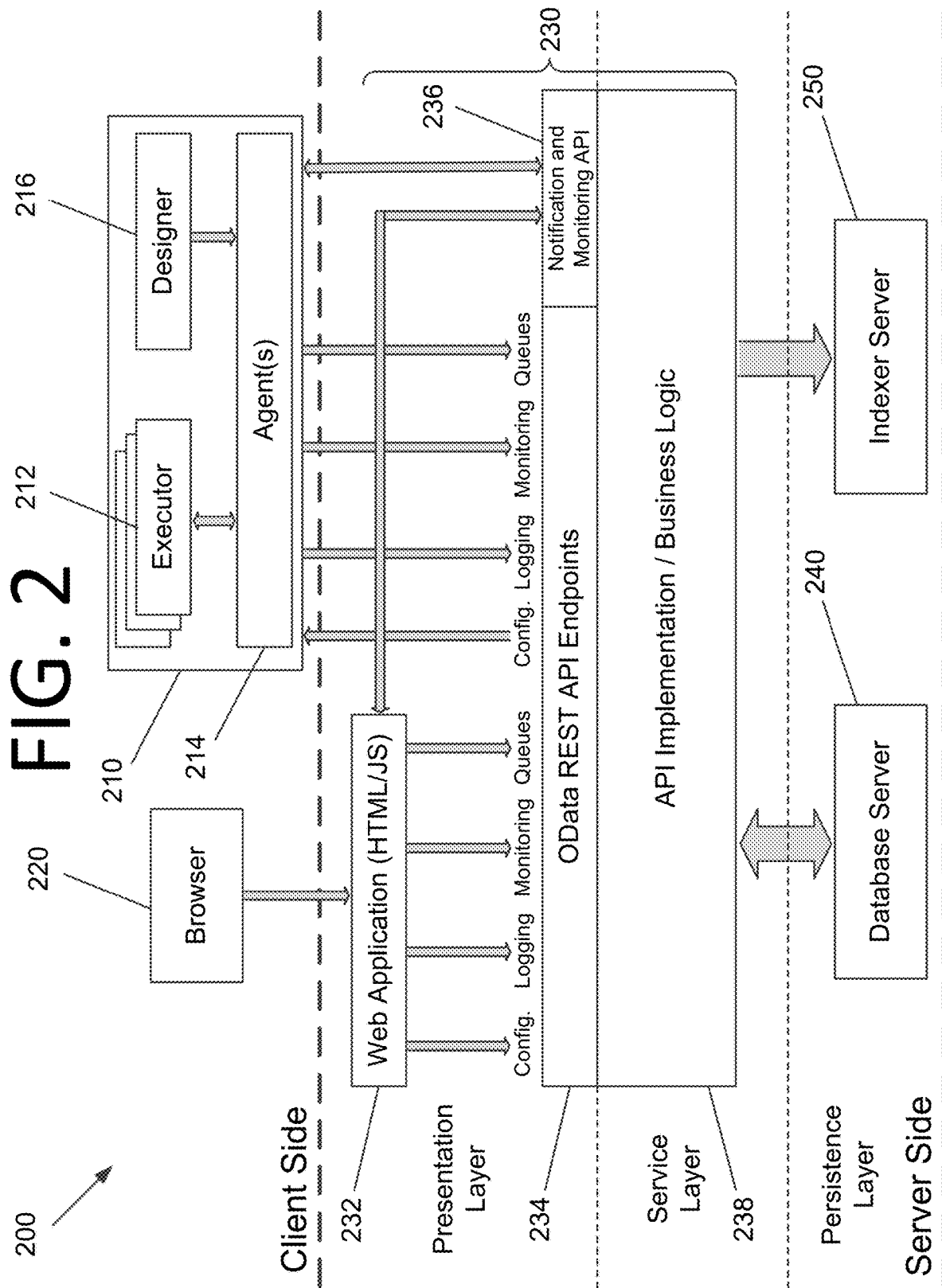
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
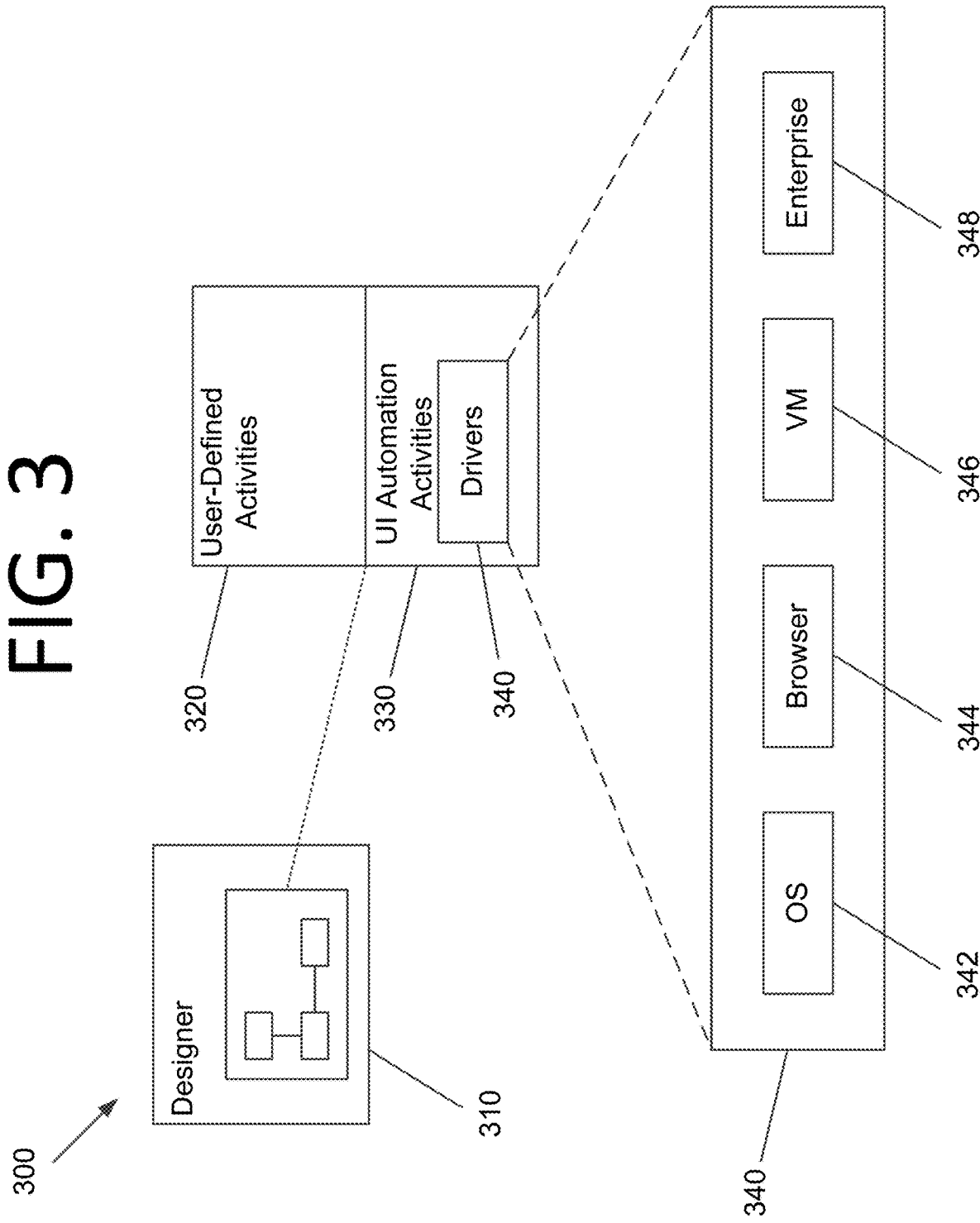
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
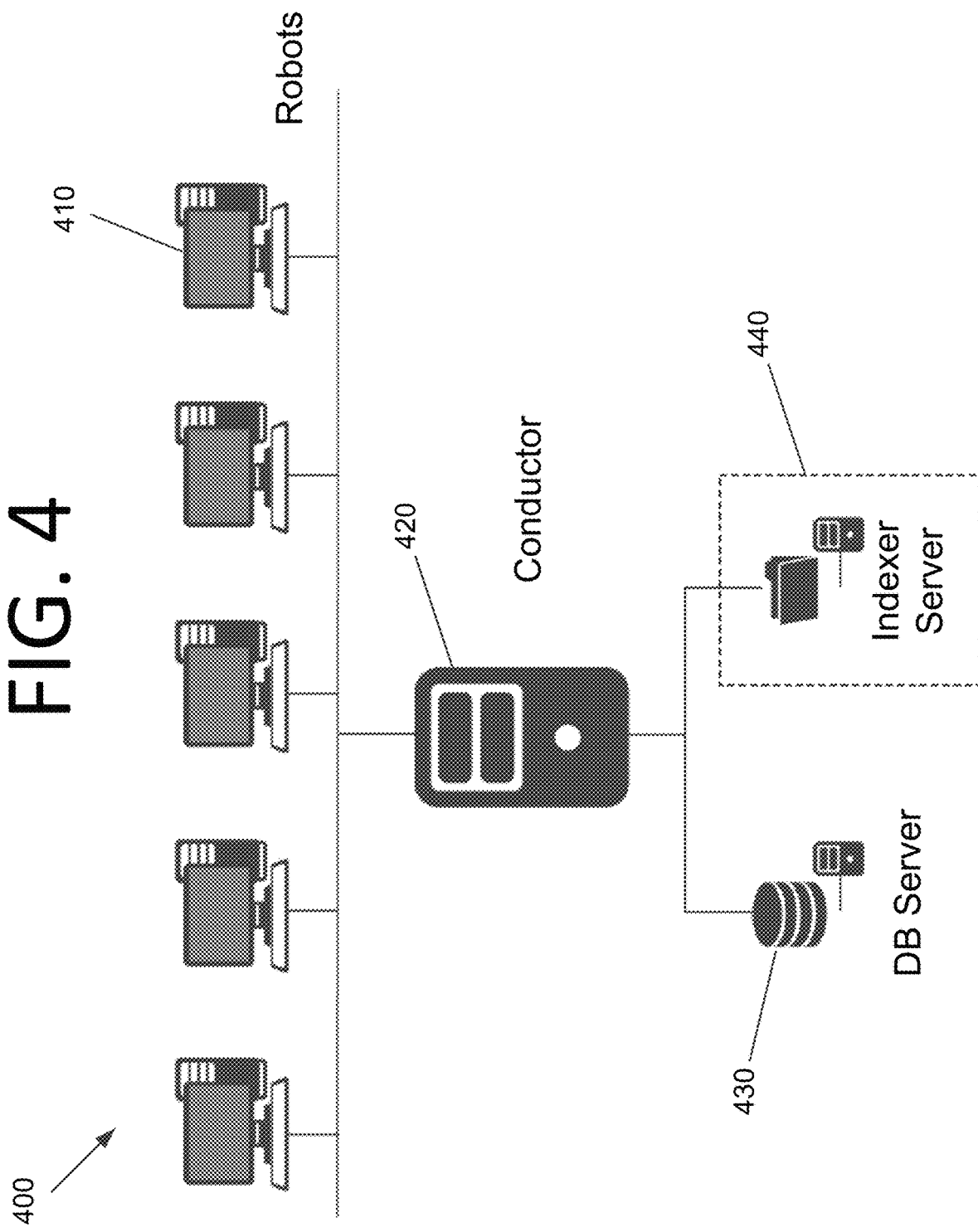
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
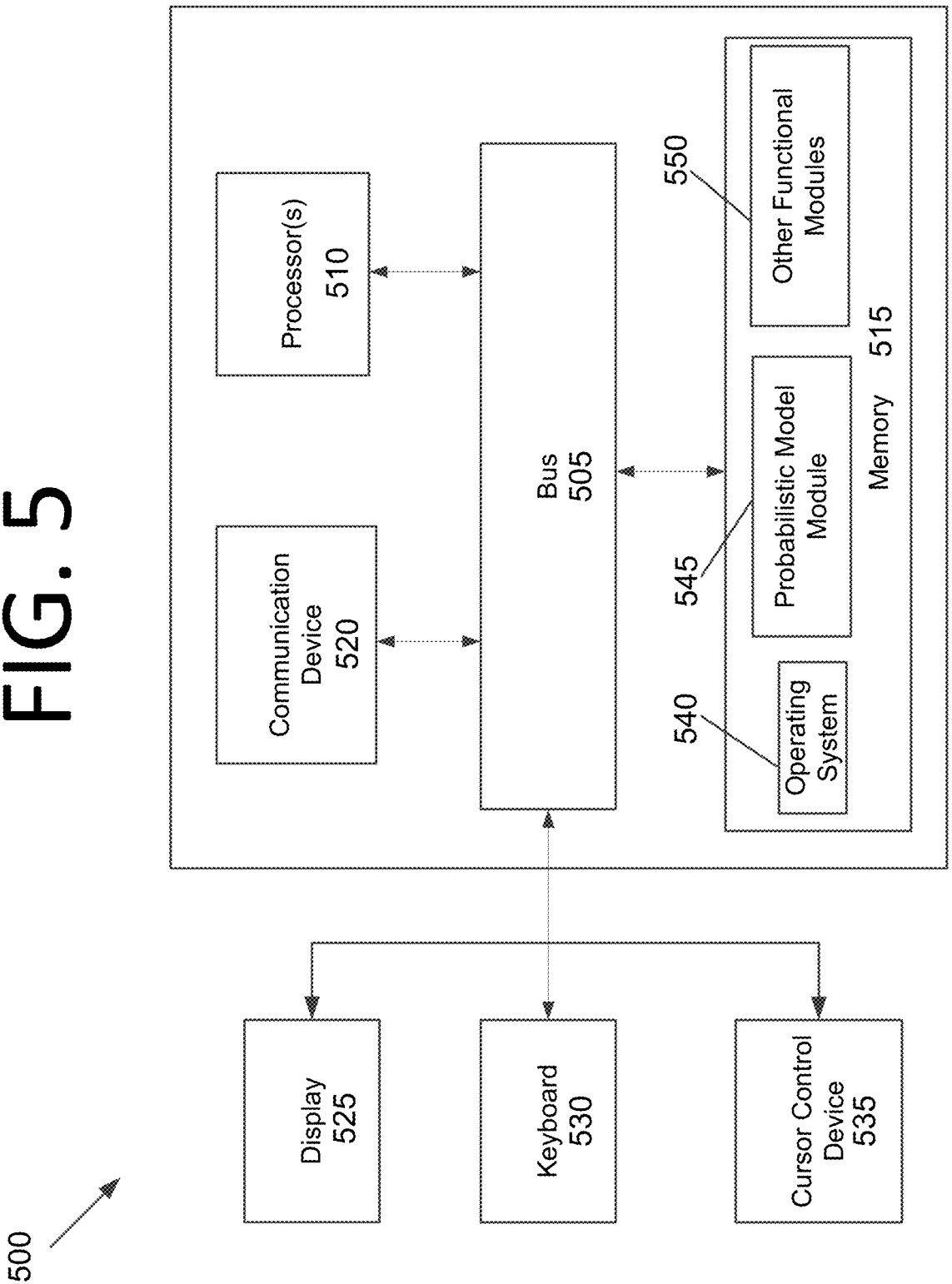
FIG. 5 is an architectural diagram illustrating a computing system configured to use probabilistic models in deterministic workflows for RPA, according to an embodiment of the present invention.

FIG. 5 is an architectural diagram illustrating a computing system 500 configured to use probabilistic models in deterministic workflows for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a probabilistic model module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
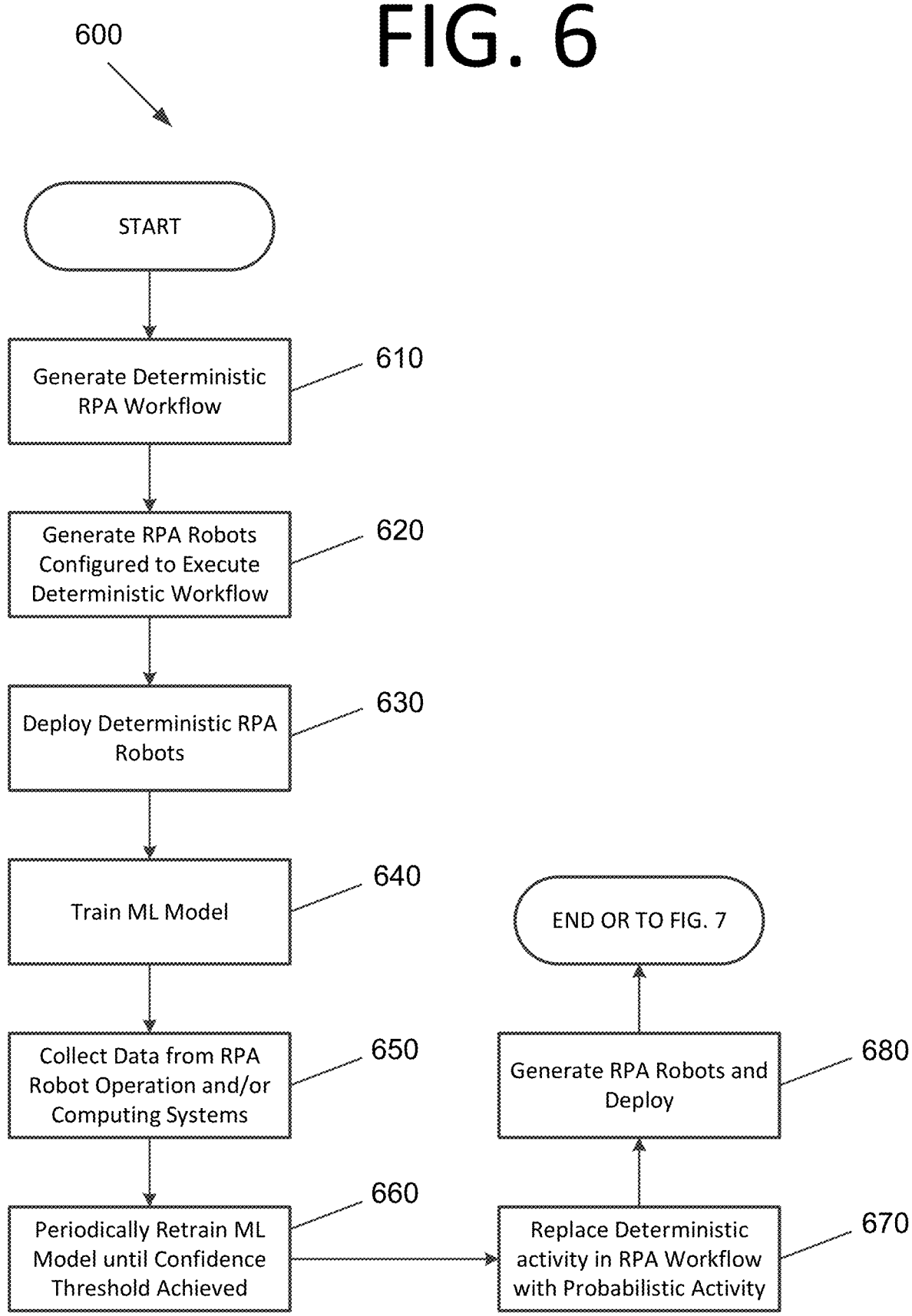
FIG. 6 is a flowchart illustrating a process for implementing probabilistic models in a deterministic workflow for RPA, according to an embodiment of the present invention.

FIG. 6 is a flowchart illustrating a process 600 for implementing probabilistic models in a deterministic workflow for RPA, according to an embodiment of the present invention. The process begins with generating a deterministic RPA workflow for RPA robots at 610. RPA robots configured to execute the deterministic RPA workflow are generated at 620. The RPA robots are then deployed at 630.

An ML model associated with a probabilistic activity to replace a deterministic activity in the deterministic RPA workflow is trained at 640. Data is collected from RPA robots implementing the deterministic workflow, their associated computing systems, or both, at 650. For instance, the data may include, but is not limited to, operations undertaken by the robots, user interactions with the computing systems (e.g., buttons pressed, mouse movements, applications used, etc.), processes run by the computing systems, corrections made by users, etc. This data is then used to periodically retrain the ML model until a desired confidence threshold is achieved at 660. A probabilistic workflow including the probabilistic activity that replaces the deterministic activity is then generated at 670 and RPA robots implementing the workflow are generated and deployed at 680.

Figure 7:
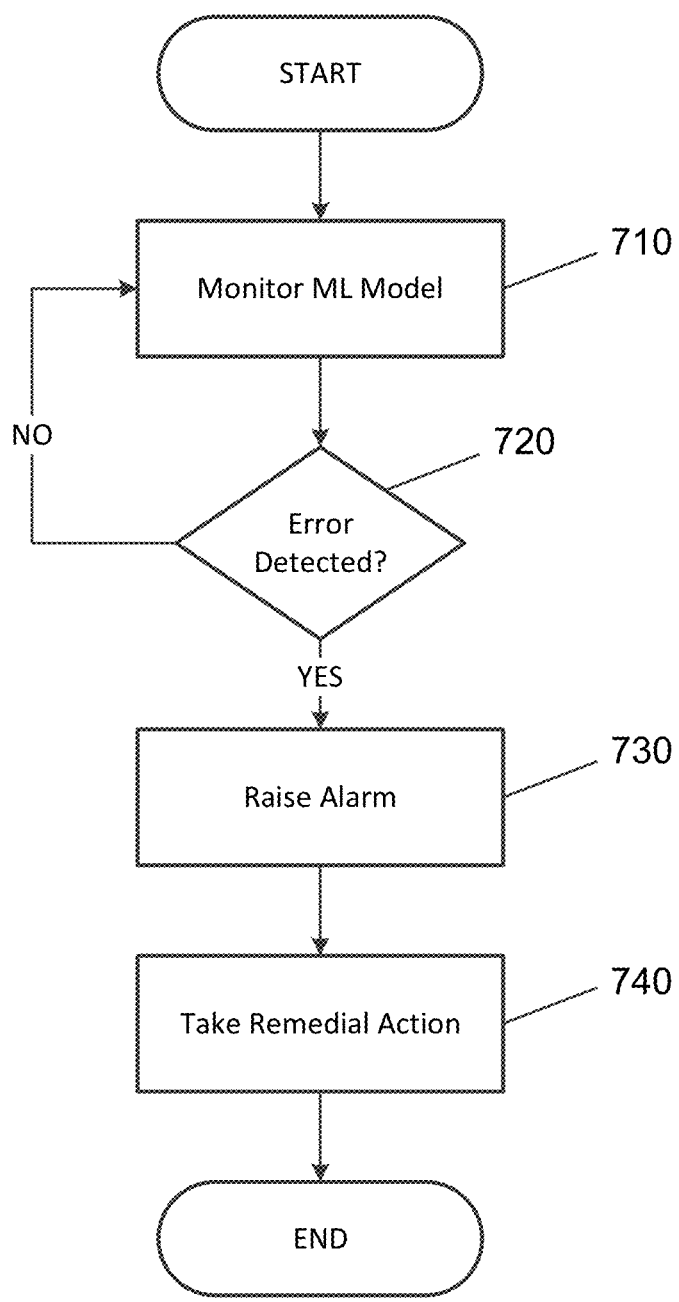
FIG. 7 is a flowchart illustrating a process for a supervisor system, according to an embodiment of the present invention.

FIG. 7 is a flowchart illustrating a process 700 for a supervisor system, according to an embodiment of the present invention. In some embodiments, process 700 may be implemented via supervisor system 810 of FIG. 8. The process begins (or continues from FIG. 6) with a supervisor system monitoring an ML model called by a probabilistic activity in an RPA workflow at 710 to ensure that the ML model is operating correctly using metrics on an input side via a data drift detector and on an output side using a concept drift detector. In some embodiments, the supervisor system may monitor multiple ML models. In certain embodiments, the concept drift detector determines whether the output falls within a predetermined range.

When no error is detected at 720, the monitoring continues at 710. However, when the data drift detector, the concept drift detector, or both, indicate an error, an alarm is raised at 730 (e.g., sending a message to a computing system or a robot that an error has been detected). The supervisor system then takes remedial action at 740. The remedial action may include, but is not limited to, disabling an RPA robot, bypassing the RPA robot, rolling back to a previous version of the ML model, etc.

Figure 8:
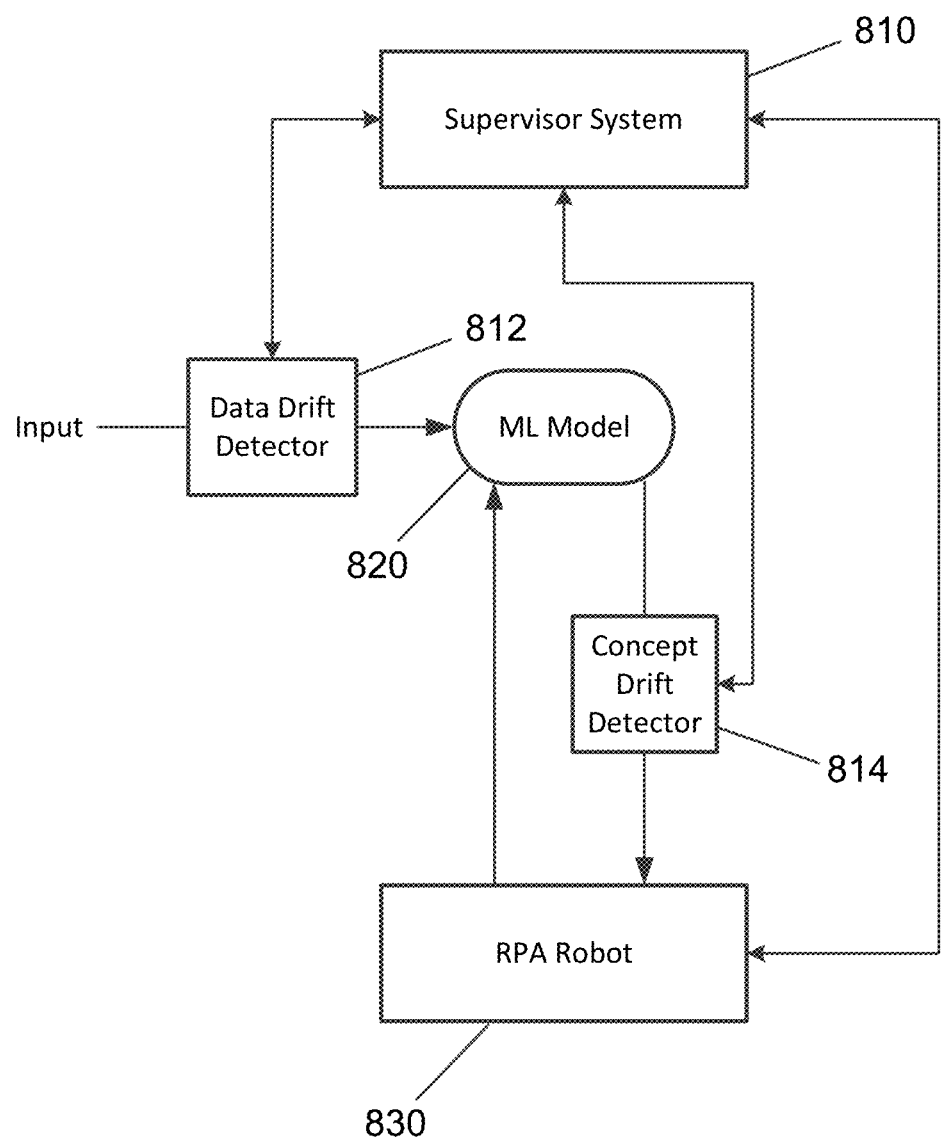
FIG. 8 is an architectural diagram illustrating a supervisor system, according to an embodiment of the present invention.

FIG. 8 is an architectural diagram 800 illustrating operation of a supervisor system 810, according to an embodiment of the present invention. Supervisor system includes a data drift detector that monitors input to an ML model 820 and a concept drift detector 814 that monitors output from ML model 820. RPA robot 830 calls ML model 820. When supervisor system 810 receives an error from data drift detector 812 and/or concept drift detector 814, supervisor system 810 may disable or bypass RPA robot 830, generate an alarm, etc.

The process steps performed in FIGS. 6 and 7 may be performed by a computer program, encoding instructions for the processor(s) to perform at least part of the process(es) described in FIGS. 6 and 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6 and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an embodiment, a computer-implemented method includes generating a deterministic RPA workflow and training an ML model associated with a probabilistic activity to replace a deterministic activity in the deterministic RPA workflow. The computer-implemented method also includes collecting data from RPA robots implementing the deterministic workflow and their associated computing systems and using the collected data to periodically retrain the ML model until a confidence threshold is achieved. Then, the computer-implemented method includes generating a probabilistic workflow including the probabilistic activity, replacing the deterministic activity.

The invention claimed is:

1. A computer-implemented method for implementing probabilistic models in a deterministic workflow for robotic process automation (RPA), comprising:
generating a deterministic RPA workflow comprising a deterministic activity, by an RPA designer application;
generating an RPA robot configured to execute the deterministic RPA workflow, by the RPA designer application;
collecting data from a plurality of deployed RPA robots executing the deterministic RPA workflow, collecting data from computing systems on which the deployed RPA robots are running, or both;
training a machine learning (ML) model associated with a probabilistic activity to replace the deterministic activity in the RPA workflow; and
replacing the deterministic activity with the probabilistic activity, by the RPA designer application.

2. The computer-implemented method of claim 1, further comprising:
    periodically retraining the ML model using the collected data.

3. The computer-implemented method of claim 2, wherein the replacing of the deterministic activity in the RPA workflow with the probabilistic activity occurs after the ML model achieves a confidence threshold.

4. The computer-implemented method of claim 3, further comprising:
    generating a plurality of RPA robots configured to execute the RPA workflow comprising the probabilistic activity; and
    deploying the plurality of RPA robots that are configured to execute the RPA workflow comprising the probabilistic activity.

5. The computer-implemented method of claim 4, further comprising:
    monitoring the ML model to ensure that the ML model is operating correctly using metrics on an input side via a data drift detector and on an output side using a concept drift detector.

6. The computer-implemented method of claim 5, wherein the concept drift detector determines whether the output falls within a predetermined range.

7. The computer-implemented method of claim 5, further comprising:
    raising an alarm when the data drift detector, the concept drift detector, or both, indicate an error.

8. The computer-implemented method of claim 5, wherein when the data drift detector, the concept drift detector, or both, indicate an error, the method further comprises:
    disabling or bypassing an RPA robot of the plurality of RPA robots.

9. The computer-implemented method of claim 5, wherein when the data drift detector, the concept drift detector, or both, indicate an error, the method further comprises:
    rolling back to a previous version of the ML model.

10. A computer-implemented method for implementing probabilistic models in a deterministic workflow for robotic process automation (RPA), comprising:
    generating a plurality of RPA robots configured to execute a deterministic RPA workflow comprising a deterministic activity, by the RPA designer application;
    deploying the plurality of RPA robots, by the RPA designer application;
    collecting data from a plurality of deployed RPA robots executing the deterministic RPA workflow, collecting data from computing systems on which the deployed RPA robots are running, or both;
    training a machine learning (ML) model associated with a probabilistic activity to replace the deterministic activity in the RPA workflow; and
    replacing the deterministic activity with the probabilistic activity, by the RPA designer application.

11. The computer-implemented method of claim 10, further comprising:
    periodically retraining the ML model using the collected data, wherein
    the deterministic activity in the RPA workflow is replaced with the probabilistic activity after the ML model achieves a confidence threshold.

12. The computer-implemented method of claim 11, further comprising:
    generating a plurality of RPA robots configured to execute the RPA workflow comprising the probabilistic activity; and
    deploying the plurality of RPA robots that are configured to execute the RPA workflow comprising the probabilistic activity.

13. The computer-implemented method of claim 12, further comprising:
    monitoring the ML model to ensure that the ML model is operating correctly using metrics on an input side via a data drift detector and on an output side using a concept drift detector.

14. The computer-implemented method of claim 13, wherein when the data drift detector, the concept drift detector, or both, indicate an error, the method further comprises:
    disabling an RPA robot of the plurality of RPA robots, bypassing the RPA robot of the plurality of RPA robots, or rolling back to a previous version of the ML model.

15. A computer-implemented method, comprising:
    generating a robotic process automation (RPA) robot configured to execute an RPA workflow comprising a probabilistic activity, by an RPA designer application;
    deploying the RPA robot;
    monitoring, by a supervisor system, a machine learning (ML) model called by the probabilistic activity in the RPA workflow, the supervisor system configured to ensure that the ML model is operating correctly using metrics on an input side via a data drift detector and on an output side using a concept drift detector; and
    raising an alarm, by the supervisor system, when the data drift detector, the concept drift detector, or both, indicate an error.

16. The computer-implemented method of claim 15, wherein the concept drift detector determines whether the output falls within a predetermined range.

17. The computer-implemented method of claim 15, wherein when the data drift detector, the concept drift detector, or both, indicate an error, the method further comprises:
    disabling an RPA robot of the plurality of RPA robots, bypassing the RPA robot of the plurality of RPA robots, or rolling back to a previous version of the ML model, by the supervisor system.

* * * * *